Jan. 30, 1945. D. F. ALEXANDER 2,368,084
PROTECTOR
Filed Aug. 27, 1942
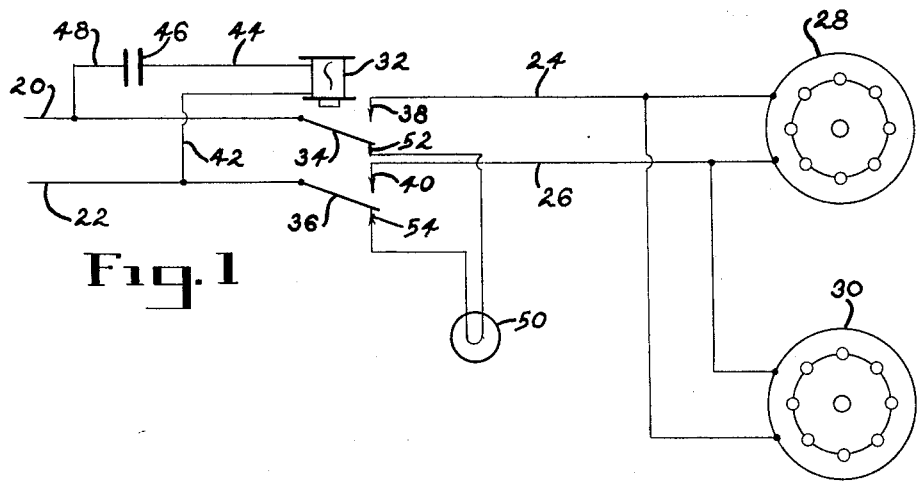
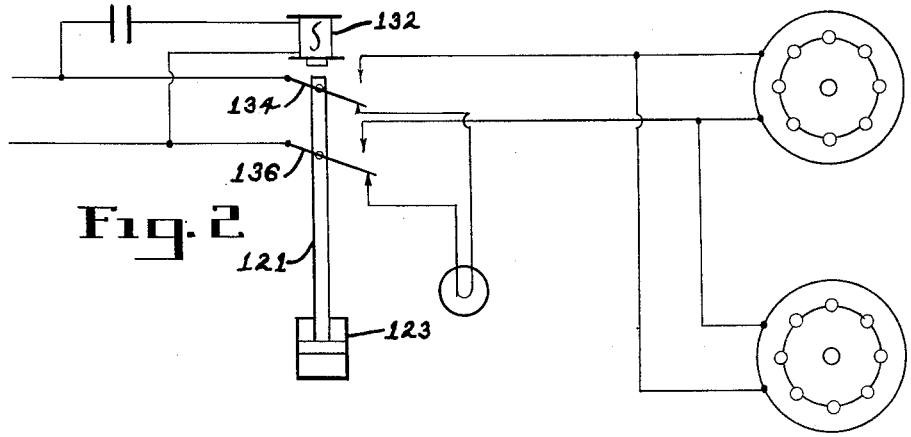
INVENTOR.
Donald F. Alexander
BY Spencer Hardman and Fehr
attorneys Patented Jan. 30, 1945

2,368,084

UNITED STATES PATENT OFFICE 2,368,084

PROTECTOR

Donald F. Alexander, Oakwood, Ohio, assignor to General Motors Corporation, Dayton, Ohio, a corporation of Delaware Application August 27, 1942, Serial No. 456,426

5 Claims. (Cl. 177—311)

This invention relates to means for protecting an alternating current circuit from connection to a direct current supply source.

There is much portable electrical equipment. Many portable electrical machines are built for both alternating current and direct current operation. Such a construction, however, is more expensive than when the equipment is only built for alternating current. The standard alternating current motors and much other electrical equipment are much simpler when built for alternating current service only. At the present time there are relatively few areas wherein only direct current is supplied, so that there is comparatively little need for electrical equipment which is built for both alternating and direct current supply.

There is, however, a need for protecting the alternating current equipment in the event it should accidentally be connected to a direct current supply source. The reason for this is that in an alternating current circuit the reactance is depended upon in addition to the resistance to limit the current flow. When direct current is supplied, its magnitude depends upon the resistance alone. For this reason the current flow in a given circuit is normally greater when direct current is supplied than when alternating current is supplied, and therefore the equipment in an alternating current circuit is much more likely to be damaged when connected to a direct current power source of substantially equal or greater voltage.

It is an object of my invention to provide a simple inexpensive means for preventing the energization of an alternating current circuit with a direct current power source.

It is another object of my invention to provide an indicating means for indicating the connection of a direct current supply source to an alternating current circuit.

These objects are attained by providing a normally open relay having its coil connected across the supply leads in series with a capacitor. When the relay is in the open circuit position an indicating light will be energized upon connection to a direct current power source to indicate the application of direct current to the circuit.

Further objects and advantages of the present invention will be apparent from the following description, reference being had to the accompanying drawing wherein a preferred form of the present invention is clearly shown.

In the drawing:

Fig. 1 is a wiring diagram illustrating one form of my invention; and

Fig. 2 is a wiring diagram illustrating a modified form of my invention.

Referring now to the drawing and more particularly to Fig. 1, there are shown supply conductors 20 and 22 which are to be connected to a suitable source of alternating current supply. These conductors 20 and 22 are to be connected to conductors 24 and 26 of an alternating current circuit which may include the alternating current motors 28 and 30.

Where the alternating current circuits 24 and 26 as well as the motors 28 and 30 are a part of some portable equipment they may become damaged should the circuit be connected to a direct current power source. The reason for this is that in an alternating current circuit, the resistance to current flow depends both upon the resistance and the reactance in the circuit, whereas in a direct current circuit the flow of current depends only upon the resistance. Thus, if this circuit were connected to direct current of substantially the same or higher voltage the motors 28 and 30 would be very likely to be damaged by the excessive flow of current.

In order to prevent the energization of the alternating current circuit 24 and 26 and particularly the motors 28 and 30, I provide a relay 32 having movable contacts 34 and 36 which are normally open. That is, these contacts are in their lower positions when the relay 32 is de-energized. When in its upper position the movable contact 34 engages the stationary contact 38 to connect the conductor 20 with the conductor 24 and when the movable contact 36 is in its upper position it engages the stationary contact 40 to connect the conductor 22 with the conductor 26.

In order to cause the relay 32 to be energized when alternating current is applied to the conductors 20 and 22 to connect the conductors 20 and 22 with the conductors 24 and 26, the relay 32 is connected by the conductor 42 to the supply conductor 22 and is connected by conductor 44 to a capacitor 46 which in turn is connected by the conductor 48 to the supply conductor 20. The capacitor 46 must be of proper capacitance to avoid resonance effects with the relay coil, and also to avoid excessive current increases above normal for the relay coil. When alternating current is applied to the conductors 20 and 22, the alternating current will pass from the conductor 48 through the capacitor 46 and the conductor 44 to the relay coil 32 and the conductor 42 to cause the lifting of the movable contacts 34 and 36 so that they contact the stationary contacts 38 and 40 to connect the conductors 20 and 22 with the conductors 24 and 26 to energize the motors 28 and 30.

Should direct current be applied to the conductors 20 and 22 the relay 32 will not be energized because the direct current cannot pass the capacitor 46. Therefore the movable contacts 34 and 36 will not be lifted. In such a situation it might not be obvious that the failure to energize the circuit is due to direct current supply. To indicate the cause of this difficulty, I have provided an indicating light 50 which is connected to the stationary contacts 52 and 54 which are engaged by the movable contacts 34 and 36 when in their lower positions. This will cause the conductors 20 and 22 to be connected only to the signal light 50 when the direct current supply source is connected to the conductors 20 and 22. This will indicate that the difficulty is in the supply source.

In the above circuit, there may be an initial momentary rush of current through the relay upon connection to a direct current power source which may cause a momentary closing of the relay 32. To prevent this it is suggested that the supply relay 32 be provided with a time delay. This is illustrated in Fig. 2 in which the movable contacts 134 and 136 are connected by a rod 121 with a dash-pot 123 which will delay the operation of the relay 132 for a limited period of time sufficient to prevent its momentary closing upon the initial connection of direct current thereto. In all other respects Fig. 2 is identical to Fig. 1.

While the form of embodiment of the invention as herein disclosed, constitutes a preferred form, it is to be understood that other forms might be adopted, all coming within the scope of the claims which follow.

What is claimed is as follows:

1. In combination, an electrical circuit including alternating current apparatus capable of operating only upon alternating current and subject to damage when direct current of substantially the same potential is applied, leads to said circuit, a normally open relay for connecting said leads to said circuit, said relay being provided with electrically operated closing means, conducting means for conducting electrical energy from said leads to said closing means, and means for preventing the energization of the closing means when direct current is applied to said leads.

2. In combination, an electrical circuit including alternating current apparatus capable of operating only upon alternating current and subject to damage when direct current of substantially the same potential is applied, leads to said circuit, a normally open relay for connecting said leads to said circuit, said relay being provided with electrically operated closing means, conducting means for conducting electrical energy from said leads to said closing means, and capacitor means connected in series with said conducting means for preventing the flow of direct current to said closing means.

3. In combination, an electrical circuit including alternating current apparatus capable of operating only upon alternating current and subject to damage when direct current of substantially the same potential is applied, leads to said circuit, a normally open relay for connecting said leads to said circuit, said relay being provided with electrically operated closing means, conducting means for conducting electrical energy from said leads to said closing means, and capacitor means connected in series with said conducting means for preventing the flow of direct current to said closing means, and time delay means for delaying the closing of said relay.

4. In combination, an electrical circuit including alternating current apparatus capable of operating only upon alternating current and subject to damage when direct current of substantially the same potential is applied, leads to said circuit, a normally open multipole relay having each of its individual switch devices connected to a different one of said leads, said relay having an electrical operating means capable when energized for closing each of its switch devices to connect the leads connected to the switch devices to said circuit and when deenergized releasing said switch devices to disconnect said leads from said circuit, conducting means for conducting electrical energy from said leads to said closing means, capacitor means connected in series with said conducting means for preventing the flow of direct current to said closing means, and time delay means connected directly to each of said switch devices.

5. In combination, an electrical circuit including alternating current apparatus capable of operating only upon alternating current and subject to damage when direct current of substantially the same potential is applied, leads to said circuit, a double-throw relay having a set of normally closed contacts and a set of normally open contacts, said leads and electric circuit being connected to said set of normally open contacts, an indicating means and indicating circuit connected in series with said normally closed contacts and being connected to said leads for indicating when an incorrect form of electrical energy is supplied to the leads, said relay being provided with electrically operated closing means, conducting means extending from said leads to said closing means for energizing the closing means, and capacitor means connected in series with said conducting means for preventing the flow of direct current to said closing means.

DONALD F. ALEXANDER.